Patented June 3, 1947

2,421,706

UNITED STATES PATENT OFFICE 2,421,706

BASIC LEAD SALICYLATES AND PROCESS FOR PREPARING SAME

Leonard M. Kebrich, Brooklyn, N. Y., assignor to National Lead Company, New York, N. Y., a corporation of New Jersey No Drawing. Application March 15, 1946, Serial No. 654,801

10 Claims. (Cl. 260—435)

This invention relates to basic lead salicylate compositions and to a method for preparing the same.

The present application is a continuation-in-part of co-pending application, Serial No. 462,769, filed October 20, 1942.

The only lead salt of salicylic acid whose existence is generally accepted in the chemical literature is normal lead salicylate corresponding to the formula $Pb(C_6H_4OHCOO)_2$, which may be monohydrated by the addition of 1 mol $H_2O$. This salt, according to the prior art, was commonly prepared by mixing solutions of a soluble lead salt such as lead acetate or lead nitrate and an alkali metal salicylate, whereby the product is obtained as a white crystalline precipitate. The preparation of normal lead salicylate by this method entails a significant loss of the product in washing and handling operations, owing to its appreciable water solubility.

During an investigation of the preparation of normal lead salicylate, by gradually adding salicylic acid to a slurry of lead oxide in a limited amount of water, as more fully described and claimed in co-pending application, Serial No. 462,769, filed October 20, 1942, it was observed that two basic lead salicylates, the pentabasic and monobasic, were formed before the normal salt was finally obtained. These are formed successively upon the introduction of more and more salicylic acid to a given slurry of lead oxide. The process of the present invention differs from prior methods in that the manner of reacting the salicylic acid with a slurry of lead oxide is carried on so as to produce an orderly succession of chemical reactions, controlled by observing the pH of the solution. Furthermore, the economical advantages of this invention over the prior art method of precipitating from solutions is readily apparent to those skilled in the art, in that the use of large volumes of wash water is avoided and the yield of the product is substantially complete. Thus the products of this invention are obtained with a minimum of handling and no washing, in a state of high purity without further treatment, except the usual flushing or filtering and drying. If a filtrate is obtained, it may be recycled and used again.

According to this invention, a slurry of lead oxide, (litharge, PbO) in water is prepared. Agitation is provided and to this suspension is added, at a slow, uniform rate, salicylic acid either dry or as a water slurry to form first the pentabasic and later the monobasic salt, all as more fully described below. The reaction takes place between the lead oxide and the salicylic acid at room temperature without the presence of a water-soluble lead salt, such as the acetate, nitrate, and the like, which accelerate the reaction. However, such accelerators may be used in small amounts, particularly if it is desired to prepare the pentabasic salt which corresponds to the formula $5PbO.Pb(C_6H_4OHCOO)_2$. This salt is an entirely new composition of matter.

When more salicylic acid is added to the suspension of pentabasic lead silicylate, the pH value remains constant until the solid phase contains one mol of salicylic acid per mol of lead oxide at which time the solid phase consists of monobasic lead salicylate, which corresponds to the formula $PbO.Pb(C_6H_4OHCOO)_2$. This also is an entirely new composition of matter.

On the addition of salicylic acid to the lead oxide slurry, the pH remains constant at about 9.9 until pentabasic lead salicylate is formed at which time there is an abrupt change in pH from about 9.9 to about 8.3. On the further addition of salicylic acid, the pH remains constant at about 8.3 until all the pentabasic salt is combined with salicylic acid to form the monobasic salt. The completion of the formation of the monobasic salt is accompanied by an abrupt change in pH from about 8.3 to about 4.8. According to this invention the pentabasic salt may be produced in substantially pure condition by ceasing to add salicylic acid when the pH drops to pH=8.3; mixtures of pentabasic and monobasic lead salicylates may be produced by ceasing to add salicylic acid before the pH begins to drop below pH=8.3 and the monobasic salt may be produced in substantially pure condition by ceasing to add salicylic acid when the pH value begins to drop below pH=8.3. In practice the drop in pH is so rapid and abrupt that upon completion of the formation of the monobasic salt the pH value of the suspension is found to be at pH=4.8 at which point if additional salicylic acid is added, the normal lead salicylate would be formed.

Since the monobasic salt represents the combination of two mols of PbO with two mols of salicylic acid and the pentabasic salt represents the combination of six mols of PbO with two mols of salicylic acid, these salts may be prepared according to the invention by bringing together in the manner described, amounts of the respective components in these mol relations. Expressed in terms of percentage, the amount of salicylic acid may vary between about 20.6% (for the pentabasic salt) and about 62.0% (for the monobasic salt) based upon the weight of PbO in the lead monoxide suspension. Preparation of these salts will be illustrated by the following examples.

EXAMPLE I

Pentabasic lead salicylate

A slurry comprising 1340 grams (6 mols) of lead monoxide, 7 liters of water and 3 grams of lead acetate crystals was moderately agitated in a suitable vessel at room temperature. To this suspension was added at a slow, uniform rate over a period of about 2 hours, 276 grams (2 mols) of finely powdered salicylic acid, an amount calculated to be just sufficient to combine with the lead oxide to form the pentabasic lead salicylate. As the reaction progressed, the color of the slurry gradually changed from brownish yellow to lighter shades, until when all the salicylic acid had been added, it was a snow-white color. This end point was further characterized by an abrupt change in the pH value from a previously constant value of about 9.9 to about 8.3, at which time all the lead oxide had been converted to pentabasic lead salicylate. This reaction was completed at room temperature. The white product composed of acicular crystals, after filtering and drying, contained 83.8% lead oxide and 16.2% salicylic anhydride and its specific gravity was 5.11, and it had a mean refractive index of 2.05, and an extinction angle of between 28.2° and 31.7°.

EXAMPLE II

Monobasic lead salicylate

A slurry comprising 446 grams (2 mols) of lead monoxide, 2.5 liters of water and one gram of lead acetate crystals was moderately agitated at room temperature in a suitable container. There was then added slowly and uniformly over a 5 hour period, 276 grams (2 mols) of finely powdered salicylic acid. During the progress of the reaction, when 92 grams of acid had been added it was noted that the slurry turned white and this indicated the formation of the pentabasic lead salicylate, with an attendant decrease in pH value of the liquid phase from about 9.9 to about 8.3. The acid addition was continued until the entire calculated amount was added, whereby the pentabasic lead salicylate was converted to the monobasic lead salicylate as indicated by the fact that the pH value which had remained fairly constant at about 8.3, finally dropped at the end to about 4.8. The white product, after filtering and drying, contained 63.4% lead oxide and 36.6% salicylic anhydride and its specific gravity was found to be 3.32. It had a mean refractive index of 1.90, and an extinction angle of between 16.2° and 25.0°.

The reactions illustrated in the above examples may, if desired, be operated at elevated temperatures up to the boiling point of water and they may be conducted without the aid of the lead acetate used or any other catalyst.

During the course of the preparation of the products of this invention by the successive addition of salicylic acid to a slurry of lead oxide, the most basic compound is formed first and when the PbO content is about 83.8%, the product is pentabasic lead salicylate; when it is about 63.4%, the product is monobasic lead salicylate, the product of the second stage. While it has been shown that it is thus possible to form two different basic lead salicylates, both novel, namely, the pentabasic and the monobasic, the operation may be terminated at any point, or the relative amounts of starting materials may be so selected as to form intermediate mixtures of the above compounds.

The lead salicylates of the present invention are useful as pigments and may be employd either alone or in combination with other pigments in formulating improved coating compositions.

I claim:

1. A process for preparing a basic lead salicylate selected from the group consisting of pentabasic lead salicylate, monobasic lead salicylate, and mixtures thereof, which comprises forming an aqueous slurry of lead monoxide, PbO, and while agitating the same, gradually adding thereto salicylic acid in an amount between about 20.6% and about 62.0% based upon the weight of PbO in said slurry.

2. A process for preparing pentabasic lead salicylate which comprises forming an aqueous slurry of lead monoxide, PbO, and while agitating the same gradually adding thereto salicylic acid in amount about 20.6% based upon the weight of PbO in said slurry.

3. A process for preparing monobasic lead salicylate which comprises forming an aqueous slurry of lead monoxide (PbO) and while agitating the same gradually adding thereto salicylic acid in amount about 62.0% based upon the weight of PbO in said slurry.

4. A process for preparing a basic lead salicylate composition which comprises forming an aqueous slurry of lead monoxide, PbO, containing a small amount of a salt selected from the group consisting of the water-soluble nitrates and acetates of lead, and while agitating the same gradually adding thereto salicylic acid in an amount between about 20.6% and about 62.0% based upon the weight of the PbO in said slurry.

5. A process for preparing pentabasic lead salicylate which comprises forming an aqueous slurry of lead monoxide, PbO, and while agitating the same gradually adding thereto salicylic acid until the pH of said slurry begins to drop below 9.8 and then discontinuing the addition of salicylic acid.

6. A process for preparing monobasic lead salicylate which comprises forming an aqueous slurry of lead monoxide, PbO, and while agitating the same gradually adding thereto salicylic acid until the pH of said slurry begins to drop below 8.3 and then discontinuing the addition of salicylic acid.

7. As a new composition of matter, a basic lead salicylate composition selected from the group consisting of pentabasic lead salicylate corresponding to the formula $5PbO \cdot Pb(C_6H_4OH \cdot COO)_2$ monobasic lead salicylate, corresponding to the formula $PbO \cdot Pb(C_6H_4OH \cdot COO)_2$, and mixtures of the same.

8. As a new composition of matter, pentabasic lead salicylate corresponding to the formula $5PbO \cdot Pb(C_6H_4OH \cdot COO)_2$.

9. As a new composition of matter, monobasic lead salicylate corresponding to the formula, $PbO \cdot Pb(C_6H_4OH \cdot COO)_2$.

10. As a new composition of matter, a mixture of pentabasic lead salicylate corresponding to the formula $5PbO \cdot Pb(C_6H_4OH \cdot COO)_2$, and monobasic lead salicylate corresponding to the formula $PbO \cdot Pb(C_6H_4OH \cdot COO)_2$.

LEONARD M. KEBRICH.